(12) United States Patent
Wolf (10) Patent No.: US 8,443,644 B2
(45) Date of Patent: May 21, 2013

(54) ROTARY-DRAW BENDING DIE WITH ECCENTRIC CLAMPING

(75) Inventor: Juergen Wolf, Walddorfhaeslach (DE)

(73) Assignee: Wafios Aktiengesellschaft, Reutlingen (DE)

( * ) Notice: Subject to any disclaimer, the term of this patent is extended or adjusted under 35 U.S.C. 154(b) by 688 days.

(21) Appl. No.: 12/646,700

(22) Filed: Dec. 23, 2009

(65) Prior Publication Data

US 2010/0180653 A1    Jul. 22, 2010

(30) Foreign Application Priority Data

Jan. 16, 2009 (EP) ..................................... 09000615

(51) Int. Cl.
*B21D 7/04* (2006.01)

(52) U.S. Cl.
USPC .................................. 72/149; 72/156; 72/157

(58) Field of Classification Search
USPC ................... 72/149, 150, 153, 155–157, 159, 72/369
See application file for complete search history.

(56) References Cited

U.S. PATENT DOCUMENTS

| 2,583,479 | A | * | 1/1952 | Froedge | 72/156 |
| 2,667,202 | A | | 1/1954 | Froedge | |
| 2,702,065 | A | | 2/1955 | Franck | |
| 4,843,858 | A | * | 7/1989 | Grimm et al. | 72/149 |
| 5,499,522 | A | * | 3/1996 | Schwarze | 72/157 |
| 7,827,840 | B2 | * | 11/2010 | Luckey et al. | 72/60 |
| 2009/0235708 | A1 | * | 9/2009 | Carter et al. | 72/57 |

FOREIGN PATENT DOCUMENTS

| EP | 0 374 110 A2 | 6/1990 |
| EP | 1 396 294 A1 | 3/2004 |
| EP | 1 543 891 A1 | 6/2005 |
| EP | 1 543 892 B1 | 6/2005 |
| EP | 1 591 174 B1 | 11/2005 |
| GB | 1 319 581 * | 6/1973 |
| JP | 35-13815 | 9/1935 |
| JP | 57-193235 A | 11/1982 |
| JP | 60-46915 U | 4/1985 |
| WO | WO 2007/122346 A1 | 11/2007 |

* cited by examiner

*Primary Examiner* — Dana Ross
*Assistant Examiner* — Mohammad Nourbakhsh
(74) *Attorney, Agent, or Firm* — Douglas J. Christensen (57) ABSTRACT

A rotary-draw bending die with eccentric clamping for bending elongate workpieces such as pipes, wires, profile strands, etc. The die having a twistable bending mandrel, and an associated clamp die. The clamp die can be moved relative to the bending mandrel and brought from an opened position remote from the bending mandrel. A workpiece to be bent can be inserted between the bending mandrel and clamp die to a clamping position on the bending mandrel or vice-versa and is freely twistable about a swivel axis which is offset eccentrically in relation to the rotational axis of the bending mandrel. The swivel axis is disposed on a rotary plate which is rotatable relative to the bending mandrel. The clamp die is freely twistable about the swivel axis and can be moved between its clamping position and its opened position by twisting the rotary plate relative to the bending mandrel.

20 Claims, 4 Drawing Sheets

ROTARY-DRAW BENDING DIE WITH ECCENTRIC CLAMPING

This application claims priority to EP Patent Application No. 09 000 615.6 filed on Jan. 16, 2009, the disclosures of which are incorporated herein by reference in their entirety.

FIELD OF THE INVENTION

The invention relates to a rotary-draw bending die with eccentric clamping for bending elongate workpieces such as pipes, wires, profile strands or the like.

BACKGROUND OF THE INVENTION

A pipe bending die is known from EP 1 591 174 B1, in which the bending head is actuated via a total of three rotational axis. A first rotational drive rotates the bending mandrel itself, a second rotational drive rotates the bending arm with the clamp die attached thereto, and a third drive finally rotates a cam disk in which a guide element runs which is connected with the clamp die and radially displaces the same during the rotation. This known construction is relatively complex and expensive as a result of the numerous mechanical elements with which the bending arm is provided. Moreover, there is a limitation in the bending freedom as a result of its large interference contour.

EP 1 543 892 B1 describes a bending apparatus in which the clamp die rests on a toothed rack which is displaceable via a gearwheel attached to the bending axis. In order to cause the forward feed motion of the clamp die towards the bending mandrel, the bending drive needs to be actuated which then causes the pivoting of the bending mandrel together with the clamp die after the forward feed motion and clamping has been completed. In this case however it is necessary to rotate the bending axis by actuating the bending drive until the forward feed motion of the clamp die occurs and the workpiece is clamped between clamp die and mandrel. Bending is only performed afterwards. The bending mandrel must be provided with a completely round configuration, with right and left bending not being easily possible.

In the case of EP 1 543 891 A1, the clamp dies are disposed on a support which is moved on its part by means of a horizontally disposed worm radially towards the bending mandrel or away from the same. This known construction is very complex, large and relatively expensive and three different drives are required for actuation.

In the bending machine as known from EP 1 396 294 A 1, the clamp dies are disposed on guide paths on which they are moved radially by a spindle drive. Drive and spindle are integrated in the bending arm. This leads to the disadvantage of a very heavy and complex bending arm.

WO 2007122346 A1 describes a bending die arrangement in which a second rotary disk sits on a first rotary disk in an eccentric manner relative to its bending axis. A clamp die is rotatably attached in an eccentric manner on the second disk. The forward feed motion of the clamp die and the bending movement can be performed by a respective control of the three rotational movements and their superposition. However, a large basic rotary disk with a large interference contour and three drives are necessary again and the controlled drive of the various rotational axes is very complex.

A rotary bending die of the kind mentioned above is known from GB 1 319 581 A, in which the bending mandrel sits on its rotational axis in a freely rotatable manner. The clamp die which is guided in a recess of a further rotary plate in the manner of a motion link in the tensioning or releasing direction is connected in an articulated manner with a swivel axis which is also disposed eccentrically to the rotational axis of the bending mandrel on a driven rotary disk which is concentric to the bending mandrel, which connection occurs via a swiveling lever which is linked to its swivel axis. By twisting the rotary disk relative to the bending mandrel, a workpiece to be bent can be clamped between clamp die and bending mandrel and thereafter be bent around the same by further rotation of the rotary disk together with the bending mandrel. The clamp die can be moved away from the bending mandrel and the workpiece can be released again by means of rotation of the rotary disk in the opposite direction after completed bending. In this case, since there is only one driven rotational axis it needs to be rotated by actuating the drive that is also responsible for the bending until the forward feed motion of the clamp die occurs and the workpiece is clamped on the bending mandrel. Bending is performed only afterwards. The bending mandrel needs to be provided with a completely round configuration. Right and left bending is not easily possible. Since the guidance of the clamp die occurs over its entire path of adjustment in a motion link recess of a rotary plate, a large rotary plate with a large interference contour in respect of a limitation of the bending freedom is necessary for this purpose.

SUMMARY OF THE INVENTION

Embodiments of the invention relate to a rotary-draw bending die with eccentric clamping for bending elongate workpieces such as pipes, wires, profile strands or the like, comprising a twistable bending mandrel, a clamp die which is associated with the same, can be moved relative to the same and can be brought from an opened position remote from the bending mandrel in which a workpiece to be bent can be inserted between bending mandrel and clamp die to a clamping position on the bending mandrel or vice-versa and is freely twistable about a swivel axis which is offset eccentrically in relation to the rotational axis of the bending mandrel, with the clamp die being displaceable between its clamping position and its opened position by twisting a rotary plate or disk relative to the bending mandrel.

Embodiments of the invention provide a rotary-draw bending die of the kind mentioned above which is compact in its configuration, offers in total a compact bending head in addition to a compact configuration of the clamping unit, is suitable for left and right bending, and has an only very low interference contour with respect to the bending freedom.

This is achieved in accordance with certain embodiments of the invention in a rotary-draw bending die of the kind mentioned above in such a way that the swivel axis of the clamp die is disposed on a rotary plate or disk which is rotatable relative to the bending mandrel and is concentric to the same, with the bending mandrel being connected with a base plate via a hollow cylindrical intermediate element and the rotary disk or plate being attached in a concentric manner in the same.

In the rotary-draw bending die in accordance with certain embodiments of the invention, it is achieved merely by twisting the rotary disk or plate relative to the bending mandrel as a result of the free swivelability of the clamp die about its swivel axis and the configuration of the forward feed motion of the clamp die from its clamping position to its opened position and vice-versa that for actuating the entire bending die only two rotary drives that are independent from one another need to be used and the additionally employed third drive that is used in prior known bending dies can be entirely omitted.

It is further especially advantageous that in the rotary-draw bending die in accordance with embodiments of the invention the bending mandrel is connected with a circular base plate via a hollow-cylindrically arranged intermediate element and the rotary disk or plate is arranged in the same concentrically in relation to its rotational axis.

In certain embodiments of the invention, these measures contribute towards an especially compact configuration of the rotary-draw bending die so that the bending head is also very compact and can be produced with very little effort. The rotary-draw bending die in accordance with certain embodiments of the invention also has a very large bending freedom.

A certain embodiment of the invention is that the rotary disk or plate is fastened to a cylindrical shaft which extends through the base plate and rests in a sliding manner on the bottom side of the base plate averted from the bending mandrel by means of a radially protruding flange. As a result of such interleaved arrangement of base plate and cylindrical shaft, an especially compact overall shape of this rotary-draw bending die is promoted.

It is further advantageous when the bending mandrel of the rotary-draw bending die in accordance with certain embodiments of the invention is attached in a detachable manner to the same, such that it is connected in a detachable manner for example with the intermediate element or, if there is none, in a detachable manner with the base plate.

It is similarly advantageous when the clamp die is provided in an exchangeable manner in the overall arrangement.

The sliding support of the cylindrical shaft on the bottom side of the base plate can advantageously be achieved by a radially protruding support region on the cylindrical shaft or also by several radially protruding regions which are offset with respect to one another in the circumferential direction and through which the desired sliding support can be guided.

An especially advantageous embodiment of the invention is that the rotary disk or plate carries a further rotary disk or plate which is concentric or coaxial to the same via a radially aligned connecting web which sits on the disk and extends over an axial length, which further rotary disk or plate is rotatably held in the hollow-cylindrical intermediate element in its end section which is axially averted from the base plate and is axially adjacent to the turning mandrel which is on its end. An especially compact arrangement of the rotary-draw bending die in accordance with the invention is also ensured in this manner.

It is further advantageous when the wall of the hollow-cylindrical intermediate element is cut open in the region between the two rotary disks or plates over the axial length of the connecting web for forming a window, with the clamp die being fastened at the axial level of the turning mandrel to a leg of an L-shaped lever which is parallel to the central axis of the intermediate element, and whose other leg extends perpendicular to the central axis of the intermediate element and protrudes into the window of the same, with the same being held there in a freely swiveling manner with its free end region on a swivel axis which is fastened at its axial ends to the two rotary disk or plates and is parallel to the central axis of the intermediate element. A configuration can again be achieved with this arrangement that is especially compact.

In certain embodiments, the window of the intermediate element shall advantageously extend in the circumferential direction to such an extent that the L-shaped lever to which the clamp die is fixed can assume two positions which are precisely opposite of one another, through which the rotary-draw bending die can be used both for right and left bending.

It is further provided in certain embodiments of the invention that latching devices which are associated with the two mutually opposite positions of the L-shaped lever are fastened to the base plate for detachably latching the same in each of these two end positions. Each latching device comprises a pin which is pretensioned in the axial direction and sits in the base plate, which is also preferable here too, which pin engages for latching into latching groove which is provided on the facing bottom side of the leg of the L-shaped lever and extends in the longitudinal direction of said lever, thus enabling not only latching in the circumferential direction but also radial guidance of the respective leg of the lever.

It is especially provided in certain embodiments of the invention that the lever carrying the clamp die rests with its one side surface on an axially extending end wall of the window in its two mutually opposite positions, thus leading to an additional rotary support in one direction of rotation for the lever and thus the clamp die, in addition to latching.

DETAILED DESCRIPTION

Figure 1:
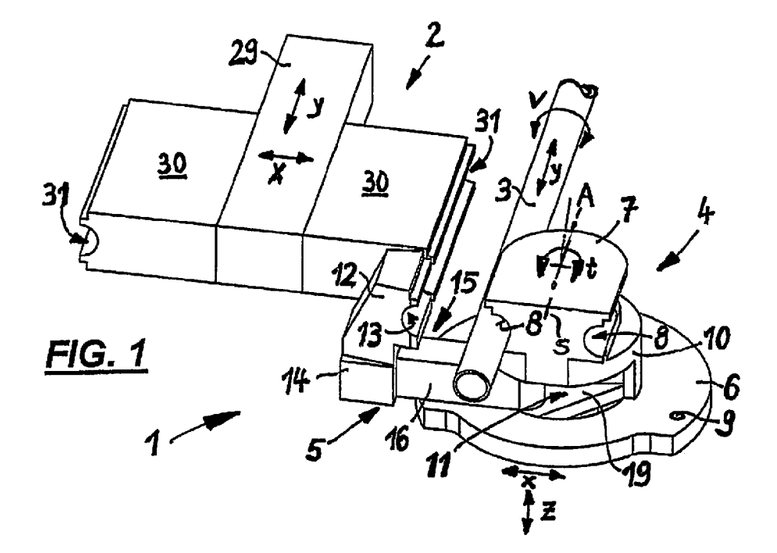
FIG. 1 shows a perspective oblique view of the upper section of a rotary-draw bending die in accordance with the invention in a fully opened position with an inserted pipe.
Figure 2:
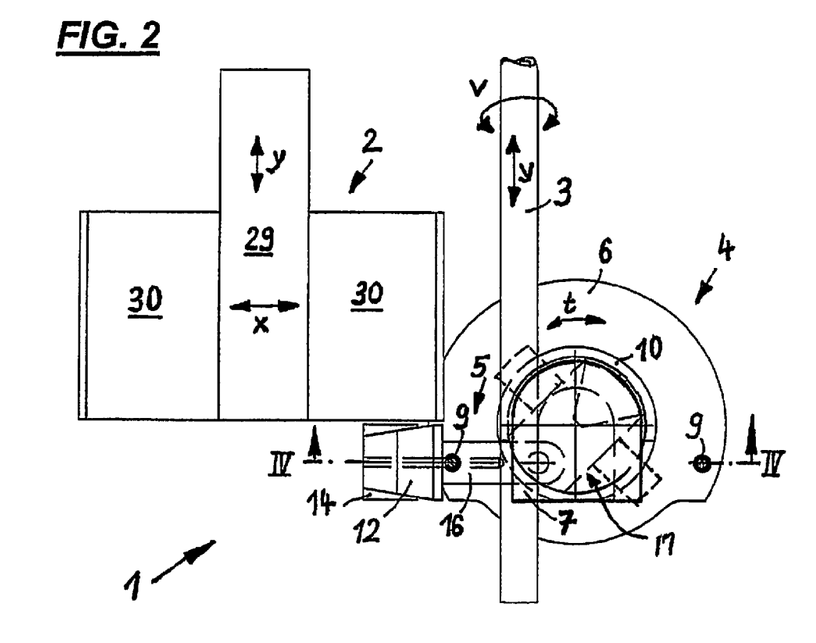
FIG. 2 shows a top view of the arrangement of FIG. 1.
Figure 3:
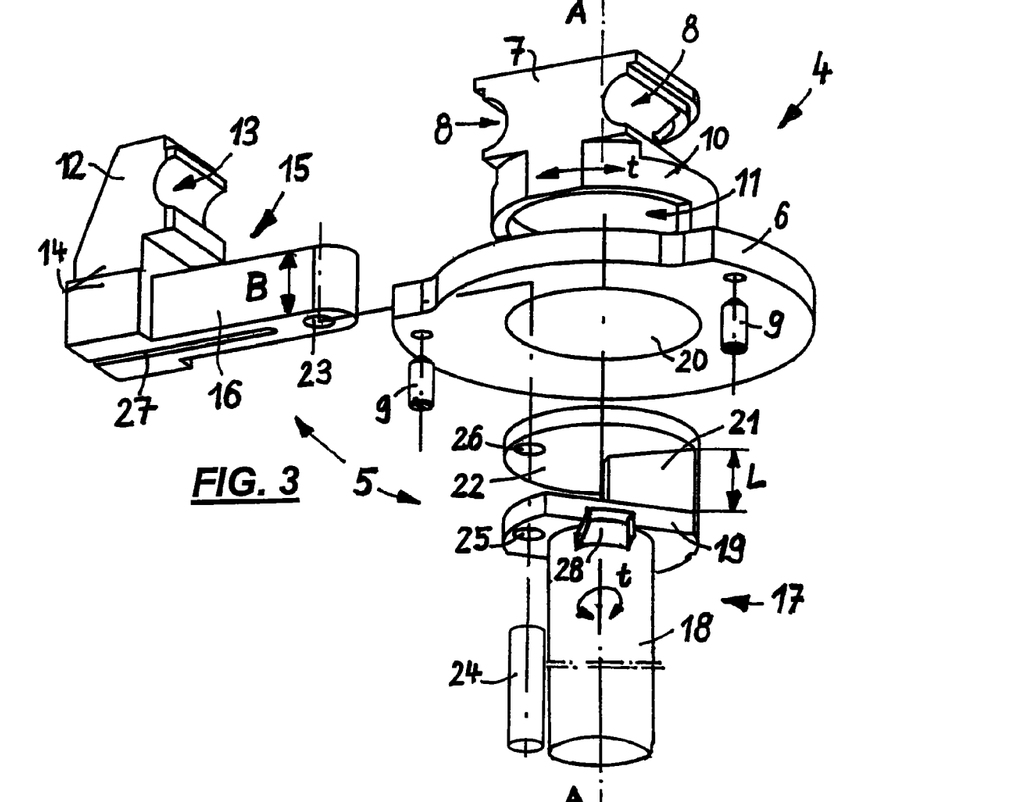
FIG. 3 shows an exploded view of the rotary-draw bending die of FIG. 1 in accordance with the invention (without slide bar).
Figure 4:
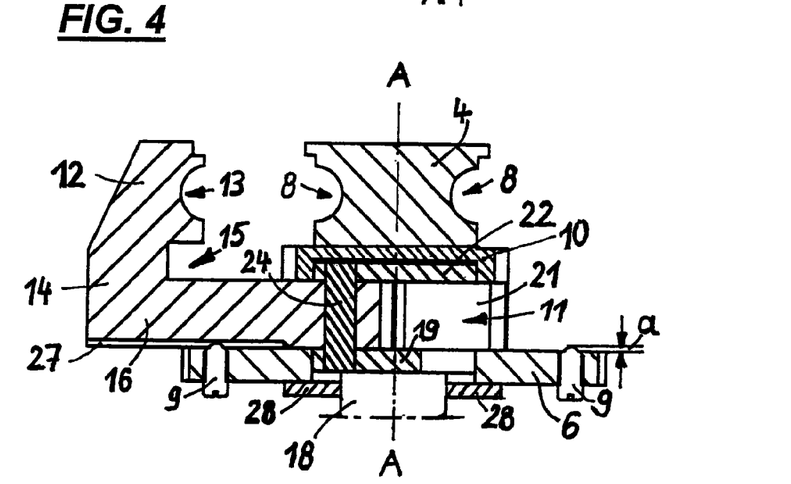
FIG. 4 shows a sectional view through the rotary-draw bending die in accordance with the invention along a line of intersection IV-IV in FIG. 2.

FIG. 1 shows a rotary-draw bending die 1 together with a slide bar arrangement 2 in an oblique perspective view and in FIG. 2 in a top view. FIG. 3 shows an exploded view of this bending die, and FIG. 4 shows a sectional view through the arrangement of FIG. 2 along the line of intersection IV-IV. Such a bending die is used for bending elongate strand-like workpieces 3, e.g. for bending tubes, profiles, wires or other strand-like parts. Insofar as a workpiece 3 is shown in the drawings, it is shown in the form of a tube (only by way of example).

As is shown best from FIGS. 1 and 3, the bending die 1 substantially consists of a bending mandrel unit 4 and a clamping unit 5 in cooperation with the slide bar arrangement 2.

The bending mandrel unit 4 substantially comprises a base plate 6 which is rotatable about an axis A and a bending mandrel 7 which is provided with a bending groove 8 which is provided around three of its sides.

Two guide elements 9 are disposed in the base plate 6 which are arranged in bore holes and are pretensioned upwardly in a resilient manner. It needs to be ensured that they protrude only by a very small predetermined height a under the action of the pretension (see sectional view of FIG. 4), which will be discussed below in closer detail. The arrangement of such guide elements in the form of guide pins 9 for example in respective receiving bores of the base plate 6, including the achievement of pretension on such pins, is a technique which is well known to the person skilled in the art, which is not shown in detail in the drawings. The drawings only show the guide elements 9 which sit in respective receiving bores of the base plate 6 and protrude towards its upper side. By arranging two guide elements 9 in a mirror-symmetrical manner in relation to the axis of symmetry s of the bending mandrel 7 and the base plate 6, the possibility is provided to allow using the bending die 1 for right and left bending, which will be discussed below in closer detail.

The bending mandrel 7 and the base plate 6 are rigidly connected with each other via a substantially hollow-cylindrical intermediate element 10, in the jacket wall of which there is a cavity in the form of a window 11.

The bending mandrel 7 is arranged in the drawings with one step, which means there is only one circumferential bending groove 8 arranged on the same. It is also easily possible to provide the bending mandrel 7 with an arrangement in several steps, such that several bending grooves 8 are provided axially above one another and each provided with a different groove curvature for example.

The bending mandrel 7 can preferably also be attached in a detachable way to the intermediate element 10 in order to allow exchanging the same at any time by another bending mandrel. Similarly, the bending mandrel 7 could also be attached in a nondetachable way to the intermediate element 10 and the latter could be fastened in a detachable and exchangeable way to the base plate 6.

The bending mandrel unit 4 with the bending mandrel 7 can be twisted about the bending axis A in both directions of rotation, as is shown in FIG. 1 with arrows (t).

The clamping unit 5 consists at first of a clamp die 12 with a forming groove 13 (see FIGS. 3 and 4). It is understood that the clamp die 12 could also be arranged in several steps, which means it could have several forming grooves 13 above one another which in respect of their shaping correspond to the shaping of an associated bending groove 8 in a bending mandrel 7 which is also provided with several steps.

The clamp die 12 is disposed on its part on a short leg 14 of an L-shaped lever 15, which leg is parallel to the rotational axis (central axis) A of the bending mandrel unit 4 and is thus aligned vertically, and therefore on the outer end of a further leg 16 which extends perpendicularly to the central axis A of the intermediate element 10 or the bending mandrel unit 4 and thus horizontally (cf. FIGS. 3 and 4).

As is shown in FIG. 3, the clamping unit 5 additionally consists of a crankpin 17 which can also be twisted about the central axis or rotational axis A of the bending mandrel unit 4, but independent of the twisting of the bending mandrel unit 4 itself.

The crankpin 17 comprises at first a shaft section 18 in the form of a rotary shaft which forms a rotary disk or plate 19 at its upper end which goes beyond it on both sides in respect of diameter and which is arranged to be twistable in the assembled state in an opening 20 of the base plate 6. This rotary plate 19 can be arranged as a fully revolving circular rotary plate. In the embodiment as shown in the drawings, it only forms a strip-shaped section of such a circular plate which has a width corresponding to the diameter of the shaft section 18 and represents a middle section of a generally circular rotary disk, as is shown especially well in FIG. 3.

The rotary plate 19 is connected with a further generally circular rotary disk or plate 22 via a connecting web 21 which sits on the same and extends over an axial length L, which rotary disk or plate is fastened to the protruding end of said rotary plate, is coaxial to the bending axis A, is arranged parallel to the rotary plate 19, and is rotatably held in the mounted state in the inside opening of the hollow-cylindrical intermediate element 10 (FIGS. 3 and 4).

The dimensions are chosen in such a way that in the mounted state the bottom side of the further rotary disk or plate 22 is disposed in the same horizontal plane as the upper boundary surface of the window 11 (cf. illustration of FIG. 4).

The window 11 in the jacket wall of the hollow-cylindrical intermediate element 10 is chosen at such an axial height that its bottom limiting wall lies in one plane with the surface of the base plate 6.

The leg 16 of the lever 15 carrying the clamp die 12 rests in a sliding manner with its bottom side on the upper side of the base plate 6 in the assembled state and protrudes into the window 11, with the height B of said leg 16 corresponding to the axial length L of the connecting web 21 and thus precisely the height of window 11 in the direction of the central axis A.

The end region of the leg 16 of the lever 15 which protrudes into the window 11 is provided with a rounded-off arrangement (semi-circular) as shown in FIG. 3 and it comprises a through-bore 23 through which a cylinder pin 24 is guided which protrudes with pin regions protruding above and beneath the leg 16 into an opening 25 and 26 accordingly provided in the rotary plates 19 and 22.

The arrangement is made in such a way that the clamp die 12 which is fastened to the lever 15 can be twisted freely about the axis which is formed by the pin 24 and is disposed eccentrically in relation to the bending axis A. This can be achieved with a pin 24 which is fixed rigidly in the rotary disks or plates 19 and 22, about which the lever 15 can pivot freely with the bore 23. It is also possible that the pin 24 is rigidly fastened in the opening 23 of lever 15 and can be held in a freely twistable way with its end sections protruding into the openings 25 and 26 of the rotary plates 19 and 22.

As is shown in FIG. 4, the leg 16 of lever 15 comprises on its bottom side a guide groove 27 which extends in its longitudinal direction and in which one of the two spring-loaded latching pins 9 can engage which are used as guide elements and latching elements, which occurs in a respective alignment of the rotational position of the lever 15 and a respective relative angular position of the rotary plates 19 and 22 relative to the base plate 6 and the intermediate element 10. When one of the guide elements 9 is latched in the guide groove 27 and is in engagement with the same, a guidance of the lever 15 in the radial direction is achieved in this way.

As is further shown in FIGS. 3 and 4, two radial projections 28 are attached to the shaft section 18 at an axial distance from the bottom side of the rotary plate 19, which projections protrude radially beyond the opening 20 in the base plate 6 and rest in a sliding manner in the installed state against the bottom side of the base plate 6 (see FIG. 4).

The angular range over which the window 11 extends in the circumferential direction of the hollow-cylindrical element 10 is chosen to be so large that in the mounted state the leg 16 of the lever 15 can be brought to a latching position with each of the two guide elements 9, such that it assumes two mutually oppositely aligned latching positions which are symmetrically twisted in relation to the axis of symmetry s (see the mutually oppositely aligned latching positions of FIGS. 1 and 2 and 6A and 6B). When the crank lever 17 is twisted in such a latching position relative to the base plate 6 in such a way that the clamp die 12 is moved to its clamping position close to the bending mandrel 7, an interlocking common twisting of clamp die 12 and bending mandrel unit 4 (in the clamping position of clamp die 12) is caused in a further twisting of the crank lever 17 effected in the same direction of rotation.

The slide bar arrangement 2 consists of a carrier 29 and two slide jaws 30, of which one each protrudes to one side of the carrier 29. The carrier 29 which carries the slide jaws 30 can be displaced in two mutually perpendicular directions x and y (see FIGS. 1 and 2), of which one (x) is disposed perpendicular to the central axis of the conveyed workpiece 3 and of which the other (y) is disposed parallel to said central axis.

A forming groove 31 is formed on each of the two slide jaws 30 at their end section averted from the carrier 29, which forming groove, as shown in FIG. 1, extends over the entire length of the respective slide jaw in the direction y and is disposed at the same level as the forming groove 13 of the clamp die 12 or the bending groove 8 of the bending mandrel 7.

As a result of this arrangement of the slide bar arrangement 2 it is possible to place the same with a slide jaw 30 to the right or left on the workpiece 3.

In order to enable a fully automatic production of bending parts, it is necessary that the bending die 1 and the workpiece 3 can be positioned and oriented in a precise manner in relation to one another. There are different arrangements of machines for this purpose in which the bending die 1 can be inserted principally.

The bending die 1 can usually be lifted upwardly and lowered downwardly in the direction Z, i.e. in the direction of the central axis A, and be displaced laterally at a right angle thereto and to the longitudinal axis 3, thus in the direction x. The workpiece 3 is supplied to the bending die 1 in the direction y and can be twisted about its longitudinal axis in the direction v (FIGS. 1 and 2).

It is also similarly known to displace the workpiece 3 laterally (in the direction x) and vertically (in the direction z) and to turn the bending die 1 about the longitudinal axis of the workpiece 3 (direction of rotation v) and to displace the same in the direction y.

The bending die 1 works as follows:

FIGS. 1, 2 and 5A to 5F show different stages in the bending of a workpiece 3.

FIGS. 1 and 2 show the opened position in which the clamping unit 5 and the slide bar arrangement 2 have assumed a position which is remote from the bending mandrel unit 4. It is thus possible to place the workpiece 3 in the bending groove 8 of the bending mandrel 7.

This opened position of the clamping unit 5 in which the clamp die 12 is in its position farthest from the rotary mandrel 7 ensures by twisting the crankpin 17 (t-cf. FIG. 3) in such a way that the swiveling axis of the clamp die 12 determined by the pin 24 is disposed to the left of the central axis A forming the bending axis, as seen in a top view. The clamp die 12 is displaced radially to the outside by the engagement of the one guide element 9 in the guide groove 27 until the end position (opened position) as shown in FIGS. 1 and 2 has been reached.

Finally, the closing and clamping process is started after inserting the workpiece 3 laterally into the bending groove 8 of the bending mandrel 7.

Figure 5A:
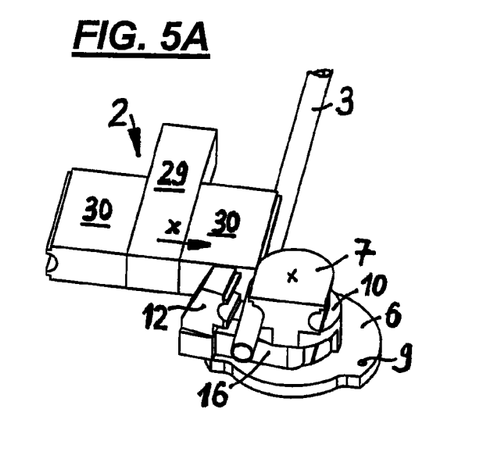
FIG. 5A shows an arrangement of FIG. 1, but with a slide bar moved towards the pipe to be bent.
Figure 5B:
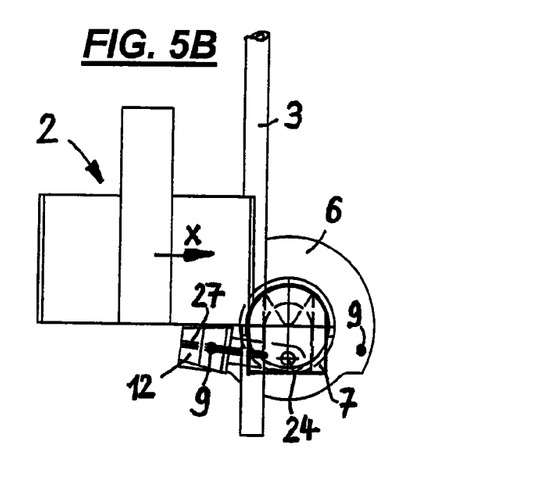
FIG. 5B shows a top view of the arrangement of FIG. 5A.

The slide bar arrangement 2 is displaced at first, as shown in FIG. 5A in a perspective view and in FIG. 5B in a top view, in the direction x laterally towards the workpiece 3 and placed laterally against the same with its forming groove 31 facing the same. The crankpin 17 is then twisted in the direction of rotation t (counter-clockwise in the top view of FIG. 5B), through which the clamp die 12 which is disposed eccentrically in relation to the bending axis will perform a swiveling movement and will perform a radial forward feed motion towards the workpiece 3, as is shown as a sequence in FIGS. 5A, 5B, and 5C (perspective view) and 5D (top view of the arrangement of FIG. 5C).

Figure 5C:
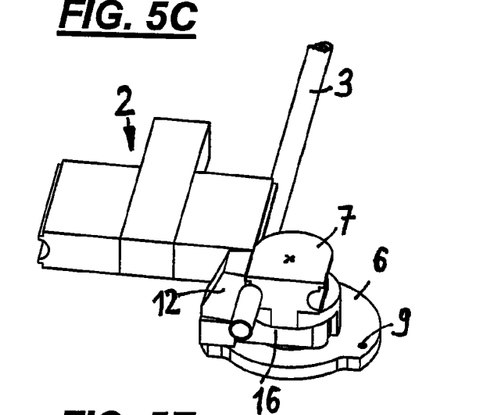
FIG. 5C shows the arrangement of FIG. 5A, but with the clamp die in its clamping position.
Figure 5D:
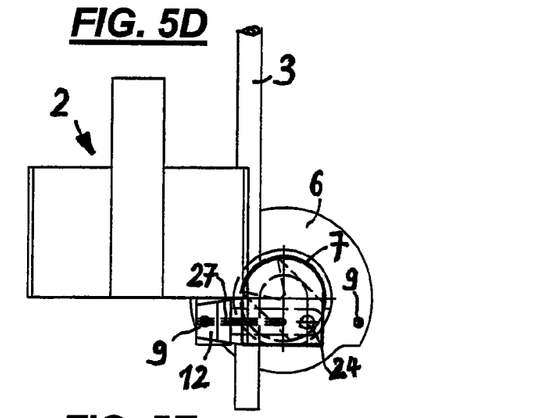
FIG. 5D shows a top view of the arrangement of FIG. 5C.

In FIGS. 5C and 5D, the clamp die 12 has reached its clamping position. The crankpin 17 is twisted to its end position which is disposed to the right of the bending axis A as seen in a top view (cf. especially FIG. 5D). In this position, the central axes of the pin 24 and the two guide elements 9 are disposed on a straight line in the top view, with the groove 13 of clamp die 12 extending parallel to the longitudinal axis of the workpiece 3 and clamping the latter against the bending groove 8 of bending mandrel 7.

Figure 5E:
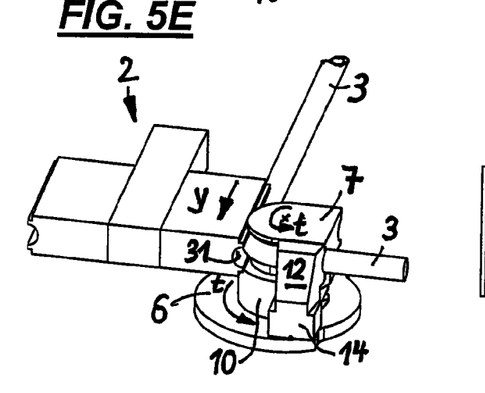
FIG. 5E shows the arrangement of FIG. 5C, but after performing a left bending of the pipe by 90°.
Figure 5F:
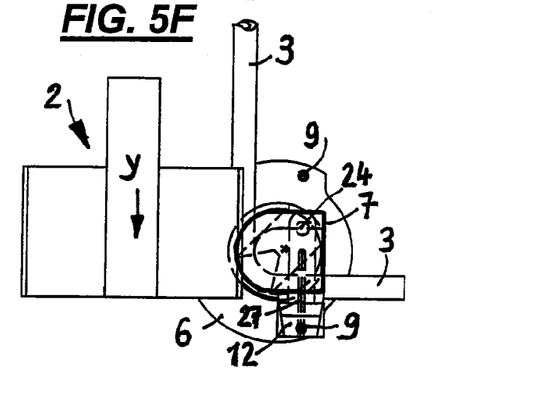
FIG. 5F shows a top view of the arrangement of FIG. 5E.

In order to perform the actual bending process, the bending mandrel unit 4 and the clamping unit 5 are pivoted jointly with the same speed about the rotational axis A and the workpiece 3 is bent about the bending mandrel 7. The slide bar arrangement 2 can also be moved simultaneously in addition axially in the direction y together with the workpiece 3. The bending end state thus achieved is shown in FIG. 5E (in a perspective view) and FIG. 5F (in a top view of the arrangement of FIG. 5E).

The clamping unit 5 is opened again by subsequent twisting of the crankpin 17 in the direction of rotation opposite of the bending rotation and thereupon the slide bar arrangement 2 is removed in the direction x from the workpiece 3. An opened position is thus reached again in which the workpiece 3 can be removed from the bending die 1. Thereafter a next bending position can be accessed by twisting (direction z) for example and by forward feeding (direction y) the workpiece 3.

When the bending die 1 is to be converted from its arrangement for left bending as shown in FIGS. 1 to 5F to right bending, the latched connection (in the position as shown in FIGS. 1 and 2) between the one guide element 9 (in the illustration of FIG. 2: the left guide element 9) and the guide groove 27 of the L-shaped lever 15 is released. For this purpose, either the slide bar arrangement 2 is moved in the direction y against the legs 14 and 16 of the L-shaped lever 15 and the clamping dies 12, and thereby presses the clamp die 12 out of its latched position. Instead of this, the crankpin 17 (in the top view of FIG. 2: as seen clockwise) could also be twisted and the latching engagement could be stopped thereby.

Both possibilities produce a rotary movement of the clamping element consisting of the clamp die 12 and the L-shaped lever 15, with the applied torque releasing the resiliently pretensioned latched connection between the respective guide element 9 and the guide groove 27.

Subsequently, the clamping unit 5 is swiveled together with the bending mandrel unit 4 about the rotational axis A (as seen in the top view: in a clockwise direction), whereupon the guide groove 27 of the clamping element can be brought into engagement with the second of the two guide elements 9 by renewed displacement of the slide bar arrangement 2 in the direction y again when the base plate 6 is moved to a position which is twisted by 180° in comparison with its position of FIG. 2.

Figure 6A:
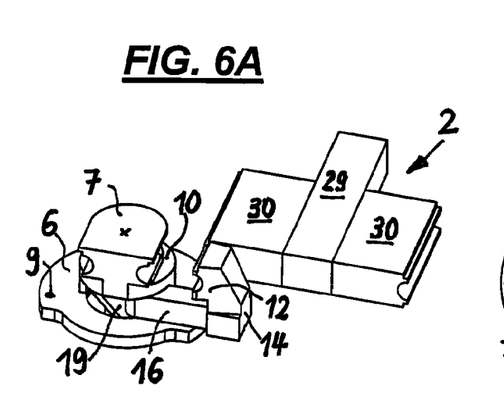
FIG. 6A shows a perspective oblique view of a rotary-draw bending die in accordance with the invention with associated slide bar, but in this case in the fully opened initial position for bending to the right.
Figure 6B:
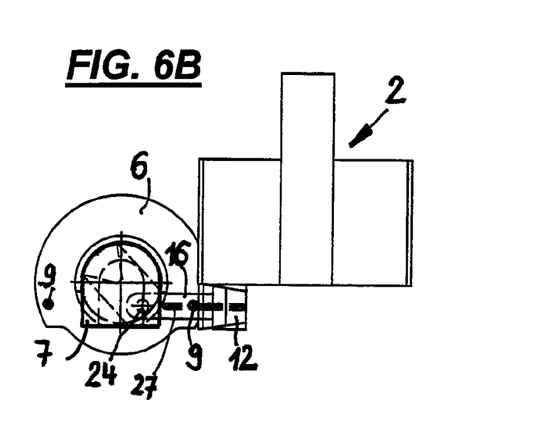
FIG. 6B shows a top view of the arrangement according to FIG. 6A.

The insertion position for right bending as shown in FIG. 6A (perspective view) and 6B (top view of the arrangement of FIG. 6A) is reached by a further occurring twisting of the clamping unit 5 together with the bending mandrel unit 4 about the rotational axis A and by a respective displacement of the slide rail arrangement 2 in the directions x and y, in which insertion position the lever 15 carrying the clamp die 12 assumes an opened position which is opposite of the opened position as shown in FIGS. 1 and 2.

The rotary drives required for twisting the bending mandrel unit 4 and the crankpin 17 are not shown in the drawings for reasons of simplicity of the illustration.

The embodiment of a rotary-draw bending die as shown in the drawings leads to the realization of a compact clamping unit and thus to an overall compact bending head which is suitable for left and right bending and in which one drive axis can be saved as compared to the rotary drives used in known rotary-draw bending dies.

The compact arrangement of the described rotary-draw bending die also comes with an only very small interference contour with a respective very small limitation of the bending freedom.

The invention claimed is:

1. A rotary-draw bending die with eccentric clamping for bending elongate workpieces, comprising:
    a rotatable bending mandrel having a rotational axis;
    a base plate having an opening and non-rotatably attached to the bending mandrel via a hollow-cylindrical intermediate element;
    a rotary plate rotatable relative to and concentric to the bending mandrel, wherein the rotary plate is disposed concentrically in the opening of the base plate and is partially rotatable with respect to said bending mandrel;
    a pin defining a swivel axis rigidly fixed in the rotary plate, wherein the swivel axis is eccentrically offset in relation to the rotational axis of the bending mandrel; and
    a clamp die associated with and movable relative to the bending mandrel and freely rotatable about the swivel axis, wherein the clamp die is displaceable between its clamping position adjacent the bending mandrel and its opened position remote from the bending mandrel or vice-versa by the rotating of the rotary plate.

2. The rotary-draw bending die according to claim 1, wherein the bending mandrel is detachably attached with the intermediate element.

3. The rotary-draw bending die according to claim 1, further comprising the rotary plate fastened to a cylindrical shaft, the cylindrical shaft held in the base plate and rests axially in a sliding manner on the bottom side of the base plate opposite the bending mandrel.

4. The rotary-draw bending die according to claim 2, further comprising the rotary plate fastened to a cylindrical shaft, the cylindrical shaft held in the base plate and rests axially in a sliding manner on the bottom side of the base plate opposite the bending mandrel.

5. The rotary-draw bending die according to claim 3, further comprising a radially protruding support region disposed on the cylindrical shaft that slidingly engages with the bottom side of the base plate.

6. The rotary-draw bending die according to claim 3, further comprising another rotary plate concentric to and attached to the rotary plate via a radially aligned connecting web having an axial length, the another rotary plate and the rotary plate separated by the axial length, and the another rotary plate rotatably held in the hollow-cylindrical intermediate element end section, the end section axially spaced from the top side of the base plate.

7. The rotary-draw bending die according to claim 4, further comprising another rotary plate concentric to and attached to the rotary plate via a radially aligned connecting web having an axial length, the another rotary plate and the rotary plate separated by the axial length, and the another rotary plate rotatably held in the hollow-cylindrical intermediate element end section, the end section axially spaced from the top side of the base plate.

8. The rotary-draw bending die according to claim 6, further comprising:
    a wall of the hollow-cylindrical intermediate element having an opening in the region between the rotary plate and the another rotary plate over the axial length forming a window; and
    an L-shaped lever having a first leg and a second leg, the clamp die fastened at the axial level of the bending mandrel to the first leg, wherein the first leg is parallel to a central axis of the hollow-cylindrical intermediate element, and wherein the second leg extends perpendicular to the central axis of the hollow-cylindrical intermediate element and protrudes into the window, the second leg held in a freely swiveling manner on the pin defining the swivel axis, the pin fastened at its axial ends to the rotary plate and the another rotary plate and parallel to the central axis of the hollow-cylindrical intermediate element.

9. The rotary-draw bending die according to claim 8, wherein the window of the hollow-cylindrical intermediate element extends in the circumferential direction to such an extent that the L-shaped lever can assume two positions therein which are opposite of each other and symmetrical in relation to an axis of symmetry of the bending mandrel.

10. The rotary-draw bending die according to claim 9, further comprising a plurality of latching devices fastened to the base plate for detachably latching the L-shaped lever in each of the two positions.

11. The rotary-draw bending die according to claim 1, further comprising:
    at least one latching device that comprises a guide pin which is pretensioned in the axial direction and sits in the base plate;
    an L-shaped lever having a first leg and a second leg; and
    a latching groove on the facing bottom side of the second leg of the L-shaped lever and extending along a longitudinal axis of the second leg, wherein the guide pin engages with the latching groove.

12. The rotary-draw bending die according to claim 9, wherein the L-shaped lever rests with a side surface on an axially extending end wall of the window in each of its two mutually opposite positions.

13. The rotary-draw bending die according to claim 10, wherein the L-shaped lever rests with a side surface on an axially extending end wall of the window in each of its two mutually opposite positions.

14. The rotary-drawn bending die according to claim 1, wherein the clamp dies are exchangeable.

15. A rotary-draw bending die with eccentric clamping for bending elongate workpieces, the bending die comprising:
    a rotatable bending mandrel having a rotational axis; and
    a clamp die movable relative to the bending mandrel, the clamp die movable from an opened position remote from the bending mandrel in which a workpiece to be bent can be inserted between bending mandrel and clamp die to a clamping position on the bending mandrel or vice-versa, the clamp die freely twistable about a pin defining a swivel axis which is offset eccentrically in relation to the rotational axis of the bending mandrel, wherein the clamp die is displaceable between its clamping position and its opened position by twisting a rotary plate relative to the bending mandrel, wherein the clamp die is disposed on the rotary plate swivel axis which is rotatable relative to and is concentric to the bending mandrel, wherein the bending mandrel is non-rotatably attached to a base plate via a hollow-cylindrical intermediate element and the rotary plate is held in a concentric manner in an opening of the base plate.

16. The rotary bending die of claim 15 wherein the bending mandrel is detachably attached with the intermediate element.

17. The rotary-draw bending die according to claim 15, further comprising the rotary plate fastened to a cylindrical shaft, the cylindrical shaft held in the base plate and rests axially in a sliding manner on the bottom side of the base plate opposite the bending mandrel.

18. The rotary-draw bending die according to claim 1, further comprising the rotary plate fastened to a cylindrical shaft, the cylindrical shaft held in the base plate and rests axially in a sliding manner on the bottom side of the base plate opposite the bending mandrel.

19. The rotary-draw bending die according to claim 4, wherein the rotary plate, the connecting web, and the another rotary plate generally define a C-shape and the pin defining the swivel axis extends axially between the rotary plate and the another rotary plate closer the open side of the C-shaped configuration.

20. The rotary-draw bending die according to claim 15, further comprising another rotary plate concentric to and attached to the rotary plate via a radially aligned connecting web having an axial length, the another rotary plate and the rotary plate separated by the axial length such that a generally C-shape is defined by the rotary plate, the connecting web, and the another rotary plate, and the pin defining the swivel axis extends between the rotary plate and the another rotary plate at the open side of the C-shaped configuration.

* * * * *